United States Patent [19]

Machon et al.

[11] 4,105,609
[45] Aug. 8, 1978

[54] DEACTIVATION OF CATALYSTS OF THE ZIEGLER TYPE USED FOR THE PREPARATION OF POLYETHYLENE IN HIGH PRESSURE, HIGH TEMPERATURE PROCESSES

[75] Inventors: Jean-Pierre Machon, Bethune; Bernard Levresse, Lillebonne; Pierre Gloriod, Lillebonne, all of France

[73] Assignee: Societe Chimique des Charbonnages, Paris, France

[21] Appl. No.: 661,414

[22] Filed: Feb. 25, 1976

[30] Foreign Application Priority Data

Feb. 28, 1975 [FR] France .................................. 75 06436

[51] Int. Cl.² ................................................. C08F 6/02
[52] U.S. Cl. .................................... 260/23 H; 526/84; 526/352; 528/486
[58] Field of Search ..................... 528/486; 260/23 H; 526/84

[56] References Cited

U.S. PATENT DOCUMENTS

| 2,985,617 | 5/1961 | Salyer | 260/45.7 |
|---|---|---|---|
| 3,009,907 | 11/1961 | Mahlman et al. | 528/486 |
| 3,075,959 | 1/1963 | Wagener et al. | 528/486 |
| 3,265,649 | 8/1966 | Faltings et al. | 260/23 |
| 3,476,698 | 11/1969 | Osterrieth et al. | 260/23 |

FOREIGN PATENT DOCUMENTS

| 1,252,417 | 12/1960 | France. |
|---|---|---|
| 1,180,634 | 6/1959 | France. |
| 1,161,737 | 9/1952 | France. |

*Primary Examiner*—Stanford M. Levin
*Attorney, Agent, or Firm*—Lerner, David, Littenberg & Samuel

[57] ABSTRACT

The present invention relates to a process for the continuous polymerisation and copolymerisation of ethylene under a pressure higher than 500 bars and at temperatures higher than about 160° C in the presence of a catalyst containing a derivative of a transition metal and an organic derivative of aluminium, wherein there is injected into the reaction mixture at the end of reaction at least one alkali metal salt or alkaline earth metal salt of a carboxylic acid, in an amount sufficient to bring about the deactivation of the catalyst, said salt being so chosen that its reaction products with the constituents of the catalyst remain in the polymer.

10 Claims, No Drawings

DEACTIVATION OF CATALYSTS OF THE ZIEGLER TYPE USED FOR THE PREPARATION OF POLYETHYLENE IN HIGH PRESSURE, HIGH TEMPERATURE PROCESSES

The present invention relates to an improved process for the preparation of polyethylene in accordance with the high pressure, high temperature processes which use a catalyst of the ZIEGLER type.

The conventional processes for the polymerisation and copolymerisation of ethylene under high pressures and at high temperatures are carried out at pressures above 500 bars and at temperatures above about 160° C, using known catalysts. On leaving the high pressure reactor (in which the polymerisation reactions have been carried out) the reaction mixture is let down in at least one separator in which the working conditions are chosen so as to separate the ethylene (and, where relevant, the other monomers) in one or more stages from the polymer which has formed in the reactor. In particular, the pressure in this first separator in below 500 bars.

If catalysts of the ZIEGLER type, which are active over a large range of temperatures and pressures, are used in the polymerisation reactor, the working conditions (temperature, pressure and residence time) in the said separator(s) may be such that the polymerisation (or copolymerisation) of the monomer (or monomers) can continue and give rise to undesirable products (for example low molecular weight products, waxes and the like), the formation of which it is desirable to avoid. The present invention relates to a process for avoiding such disadvantages.

It has already been disclosed, within the scope of the use of catalysts of the ZIEGLER type for the low pressure and low temperature polymerisation of alpha-olefins, to add various reactants (alcohols, epoxides, alkali metal hydroxides and the like) to the reaction mixture, the function of which was to eliminate the organo-aluminium compound of the polymer by causing it to react with the additive and solubilising its reaction product in a solvent (alcohol, water and the like). On the contrary, in the present invention, the reactant, which is of a different chemical nature from the additives cited above, has the function of deactivating the two constituents of the catalyst so that its reaction products with them remain in the polymer.

Accordingly, the present invention relates to an improved process for the polymerisation and copolymerisation of ethylene, under a pressure above 500 bars and at temperatures above about 160° C, in the presence of catalysts comprising a transition metal derivative and an alkyl-aluminium. This process aims to avoid the secondary reactions which might develop in the separator(s) and is characterised in that at the end of the reaction at least one product selected from alkali metal salts and alkaline earth metal salts of carboxylic acids is injected into the reaction mixture, the amount injected being sufficient to bring about the deactivation of the catalyst. However, in addition, the said alkali metal salt or alkaline earth metal salt must be so chosen that the products which it could form with the constituents of the catalyst (titanium derivatives and aluminium derivatives) are inert and are not carried with the monomer (ethylene) during recirculation. According to the invention, the products obtained as a result of the action of the metal salt on the constituents of the catalyst remain in the finished polymer.

The transition metal derivative which can be used as a constituent of the polymerisation catalyst is generally a titanium derivative and more particularly titanium trichloride which can optionally contain co-crystallised aluminium chloride. The alkyl-aluminium which can be used as the other constituent of the catalyst is preferably a trialkyl-aluminium, a dialkyl-aluminium monohalide or a pentalkylsilox alane. Furthermore, the catalysts of the type described in French Pat. No. 2,027,788, and consisting of an activated solid obtained by reacting a halogen derivative of a transition metal (for example $TiCl_4$) with a compound of the formula $Xm-nM(OR)_n$ and an organo-metallic compound of the aluminium-alkyl type are to be considered as catalysts of the Ziegler type which can be used in accordance with the invention.

As usual in this art, the proportions of the catalyst constituents are such that the atomic ratio (Al/Ti) is substantially between 1 and 10.

The process according to the invention is applicable to the polymerisation of ethylene and the copolymerisation of ethylene with other monomers which are copolymerisable with ethylene in the presence of catalysts of this type; these comonomers are, for example, alpha-olefins such as propylene, butene-1 and the like.

The ethylene polymerisation or copolymerisation reaction can be carried out in stirred autoclave reactors or in tubular reactors or in series of reactors of either the autoclave type, or the tubular type; in all cases, however, the working conditions are such that the reaction medium is homogeneous, i. e. the polymer is soluble in the reaction mixture. In this polymerisation reaction it is of course possible to use known processes for regulating the molecular weight of the polymers (e. g. injection of suitable transfer agents) or for improving the properties of the resulting products (e. g. injection of antioxidants or similar additives into the polymerisation reactor or at the outlet from the latter).

The polymerisation or copolymerisation reaction according to the invention is carried out continuously. Therefore the metal salt(s) must be injected into the reaction mixture at the point of the installation where it is considered that the polymerisation or copolymerisation reaction must be stopped. This point of the installation may be located in a zone of the reactor close to the outlet from the latter or in one of the separators in which the reaction mixture leaving the reactor is collected. In general, it is preferred that the material should be injected as close as possible to the reactor outlet valve.

The amount of metal salt injected must be sufficient to ensure deactivation of the catalyst. This deactivation is effected by destruction of at least one of the constituents of the catalyst, namely the transition metal derivative and the alkyl-aluminium. However, it is preferable to use sufficient metal salt for both of the constituents of the catalyst to react with the said salt. According to the invention, the amount of salt used is preferably such that the ratio of milliequivalent-grams of the metal in the said salt to milliatoms of aluminium and titanium contained in the catalyst is substantially between 0.4 and 8.

Amongst the alkali metal salts and alkaline earth metal salts of the carboxylic acids which can be used according to the invention, there should preferably be mentioned the alkali metal salts and alkaline earth metal salts of saturated fatty acids and of aromatic acids, such as, for example, sodium stearate, potassium stearate, calcium stearate, magnesium stearate, sodium benzoate, potassium benzoate, sodium naphthenate and potassium naphthenate. All these salts can be injected either in the pure (molten) state or in suspension or in solution in an hydrocarbon.

The main industrial advantages of the process according to the invention are the following:

Secondary reactions which might develop in the separator(s) and lead to the formation of undesirable polymeric products (for example greases or waxes) are avoided.

Amongst the possible secondary reactions, the formation of 1-butene by dimerisation of ethylene is also provided.

Easier control of the composition of the gases, and consequently of the polymerisation reaction itself, is possible when the gases are recycled.

The chlorine which may be present in the catalyst and which is liberated in the case of an uncontrolled destruction of the said catalyst, is neutralised.

The non-limiting examples which follow illustrate the invention.

EXAMPLES 1 to 8

These examples are carried out on a high pressure (1,500 bars) ethylene polymerisation line comprising a reactor of the stirred autoclave type, the volume of which is 5 liters, and two separators in series, the first of which operates at a pressure of 250 bars and the second at a pressure of 15 bars; the reaction temperature is of the order of 260° C and the mean temperature in the separators is 260° to 270° C; the average residence time of the ethylene in the reactor is 50 seconds; the catalyst used consists of violet titanium trichloride (in the form of a co-crystallised product of the formula $TiCl_3.\frac{1}{3}AlCl_3$) and of tributyl-aluminium, the atomic ratio Al/Ti being between 1 and 5; about 1% of hydrogen, acting as a transfer agent, was injected into the reactor.

The unreacted ethylene which is separated from the polymer in any of the separators is recycled into the installation.

Except for comparative example 1, the metal salt (agent for destroying the catalyst) is injected into the reactor just before the extrusion valve.

The results obtained are shown in Table I below.

In this table, the following items have been shown in the various columns:
the number of the experiment;
the name of the salt injected;
the hourly feed rate (in g/hour) of the salt (destroying agent);
the hourly production (in kg/hour) of polymer;
the density of the polyethylene expressed in $g/cm^3$, this being measured at 20° C on products which have been reheated for 1 hour at 150° C and been cooled at a speed of 50° C/hour;
the melt index (M.I.) measured in accordance with standard specification ASTM 1238-62 at a temperature of 190° C and with a load of 2.16 kg;
the polydispersity index which is the ratio Mw/Mn of the weight average molecular weight to the number average molecular weight as defined in "Polythene", Renfrew & Morgan (1957) p. 90;
the content of catalyst residues, namely Al, Ti and alkali metal or alkaline earth metal (M) expressed in ppm;
the percentage of 1-butene recycled;
the percentage of ethyl branches, this percentage — expressed in mols and determined by infra-red spectroscopy — constituting an approximate measure of the degree of copolymerisation of the 1-butene.

Each experiment is characterised by a sample taken after 2 hours' running (A) and after 4 hours' running (B); this procedure makes it possible to check that none of the destroying agent or of the products produced in the reaction between the destroying agent and the ZIEGLER initiator has been recycled (and that there are no major variations in the content of catalyst residues).

For each of experiments 1 to 8, a particular feed rate of the titanium constituent of the catalyst, and two ratios Al/Ti of the constituents of the said catalyst, one of these ratios being 1 and the other being 5, were used; Table I bis below shows the amounts of salts used in each experiment; these amounts being expressed in milliequivalent-grams of the metal of said salt to milliatoms of aluminium and titanium in the catalyst.

EXAMPLES 9 to 16

In these examples, which were carried out in an apparatus similar to that described in the examples above, the circuits for recycling the ethylene coming from the medium pressure (250 bars) separator are not used, and are shut off. Accordingly, only the circuits for recycling the ethylene coming from the low pressure separator (8 bars) are used.

The working conditions are as follows:
Reactor pressure: 1,500 bars.
Stirred autoclave reactor, 1 zone: volume 1.41.
Average residence time: 35 seconds.
Average molar percentage of hydrogen: 1 to 2%.
Catalyst system: $TiCl_3.\frac{1}{3}AlCl_3$ - $AlBu_3$.

The temperature of the separator was different in each experiment.

Excepted for comparative examples 9 to 11, the metal salt (destroying agent) is injected into the reactor just before the extrusion valve.

The results obtained are shown in Table II below.

In this table, the various columns give the following items:
number of the experiment;
name of the injected salt (destroying agent);
hourly feed rate (g/hour) of the injected salt;
hourly production (in kg/hour) of polymer;
temperature of the reactor (° C);
temperature of the separator (° C);
density of the polyethylene (in $g/cm^3$) measured as above;
melt index (M.I.) of the polyethylene, measured as above;
percentage of 1-butene recycled;
content of catalyst residues in the polyethylene:Al, Ti and M (alkali metal or alkaline earth metal) expressed in ppm.

For experiments 12 to 16, Table II (bis) gives the feed rate of the titanium constituent of the catalyst (in milliatoms of titanium per hour) and the amounts of destroying agent used for two ratios Al/Ti, one of these ratios being 1 and the other being 5.

EXAMPLES 17 to 20

Experiments were carried out analogously to experiments 9 to 16, whilst modifying the catalyst used. In experiments 17 and 18, a catalyst system composed of TiCl$_3$(in the form of TiCl$_3$.⅓AlCl$_3$) and of pentalkylsiloxalane (Me$_2$EtSiOAlEt$_2$) was used, with a catalyst feed rate corresponding to 2.7 milliatoms of titanium per hour and a ratio Ti/Al of 1 or 5.

In experiments 19 and 20, a catalyst system composed of TiCl$_4$ supported on Mg (OEt)$_2$ and activated with tributyl aluminium was used. Before activation the solid catalyst had the following weight composition: Ti = 8.2%, Mg : 28,4%, Cl : 62.3%. The catalyst feed rate is 2,2 milliatoms of titanium per hour and the ratio Al/Ti is 1 or 5.

TABLE I (bis)

| Experiment | Feed rate of the catalyst (milliatoms of Ti/hour) | Amount of destroying agent used | |
|---|---|---|---|
| | | Al/Ti = 1 | Al/Ti = 5 |
| 1 | 8.6 | 0 | 0 |
| 2 | 7.6 | 3.3 | 1.1 |
| 3 | 7.7 | 2.13 | 0.71 |
| 4 | 8.2 | 3.1 | 1.03 |
| 5 | 8 | 3 | 1 |
| 6 | 6.9 | 3.54 | 1.18 |
| 7 | 8.2 | 1.56 | 0.52 |
| 8 | 8.8 | 2 | 0.67 |

TABLE II

Injection of the destroying agent under high pressure without use of the medium pressure separator

| Experiment | Destroying agent | Hourly feed rate of the destroying agent (g/hour) | Hourly production of polymer (Kg/hour) | Reactor temperature (° C) | Separator temperature (° C) | Density | M.I. | % of butene recycled | Content of residues | | |
|---|---|---|---|---|---|---|---|---|---|---|---|
| | | | | | | | | | Ti | Al | M |
| 9 | — | — | 10.3 | 240 | 220 | 0.967 | 1.5 | 1.5 | 11 | 20 | — |
| | | | | | 270 | 0.966 | 2.0 | 1.7 | 11 | 18 | — |
| 10 | — | — | 11.0 | 260 | 220 | 0.963 | 3.1 | 2.0 | 13 | 26 | — |
| | | | | | 270 | 0.963 | 3.0 | 2.2 | 12 | 25 | — |
| 11 | — | — | 11.8 | 280 | 220 | 0.959 | 6.3 | 3.5 | 17 | 31 | — |
| | | | | | 270 | 0.958 | 6 | 4.0 | 18 | 30 | — |
| 12 | Calcium stearate | 5 | 10.5 | 240 | 220 | 0.966 | 2 | 1.3 | 10 | 20 | 32 |
| | | | | | 270 | 0.966 | 2.3 | 1.3 | 11 | 19 | 34 |
| 13 | Calcium stearate | 10 | 11.7 | 280 | 220 | 0.960 | 5.5 | 3.0 | 18 | 30 | 55 |
| | | | | | 270 | 0.960 | 5.5 | 3.1 | 18 | 28 | 56 |
| 14 | Sodium stearate | 5 | 11.0 | 260 | 220 | 0.964 | 4.1 | 1.5 | 12 | 26 | 33 |
| | | | | | 270 | 0.963 | 4 | 1.7 | 12 | 24 | 31 |
| 15 | Sodium benzoate | 5 | 11.0 | 260 | 220 | 0.963 | 3 | 1.8 | 13 | 22 | 65 |
| | | | | | 270 | 0.963 | 3 | 1.9 | 12 | 24 | 67 |
| 16 | Sodium benzoate | 5 | 11.8 | 280 | 220 | 0.960 | 7 | 3.0 | 18 | 29 | 65 |
| | | | | | 270 | 0.959 | 7.5 | 3.3 | 16 | 27 | 63 |

The results obtained are reported in Table III which comprises the same columns as those given in Table II below.

TABLE I

Injection of the destroying agent under high pressure, with use of medium pressure and low pressure separator

| Experiment | Destroying agent | Hourly feed rate of the destroying agent (g/hour) | Hourly production of polymer (kg/hour) | Density | M.I. | Mw/Mn | Catalyst residues | | | % of 1-butene recycled | % of C$_2$H$_5$ groups (mol) |
|---|---|---|---|---|---|---|---|---|---|---|---|
| | | | | | | | Ti | Al | M | | |
| 1 A | — | — | 28.4 | 0.960 | 4.3 | 8.5 | 14 | 25 | — | 2.5 | 0.5 |
| B | | | | 0.959 | 5.2 | 9.0 | 13 | 24 | — | 3.0 | 0.6 |
| 2 A | Calcium stearate | 15 | 28.0 | 0.965 | 3.8 | 4.1 | 12 | 22 | 30 | 1.5 | 0.3 |
| B | | | | 0.965 | 3.5 | 4.1 | 13 | 22 | 29 | 1.6 | 0.3 |
| 3 A | Calcium stearate | 10 | 28.4 | 0.964 | 3.8 | 4.3 | 13 | 24 | 22 | 1.7 | 0.3 |
| B | | | | 0.963 | 4.0 | 4.2 | 12 | 23 | 20 | 1.8 | 0.4 |
| 4 A | Magnesium stearate | 15 | 28.0 | 0.963 | 4.0 | 6.5 | 14 | 27 | 28 | 2.0 | 0.3 |
| B | | | | 0.963 | 4.1 | 6.5 | 14 | 26 | 27 | 2.0 | 0.4 |
| 5 A | Zinc stearate | 15 | 27.3 | 0.962 | 5.1 | 7.3 | 13 | 25 | — | 2.1 | 0.4 |
| B | | | | 0.961 | 4.9 | 7.2 | 14 | 26 | — | 2.0 | 0.5 |
| 6 A | Sodium stearate | 15 | 27.6 | 0.965 | 4.2 | 4.5 | 12 | 24 | 30 | 1.4 | 0.3 |
| B | | | | 0.966 | 4.0 | 4.6 | 12 | 25 | 28 | 1.5 | 0.2 |
| 7 A | Sodium naphthoate | 5 | 28.1 | 0.963 | 4.5 | 4.0 | 14 | 24 | 26 | 1.7 | 0.3 |
| B | | | | 0.962 | 4.5 | 4.2 | 13 | 23 | 28 | 1.9 | 0.4 |
| 8 A | Sodium benzoate | 5 | 28.0 | 0.962 | 5.0 | 4.0 | 15 | 28 | 23 | 1.8 | 0.4 |
| B | | | | 0.962 | 4.8 | 3.9 | 15 | 27 | 25 | 1.8 | 0 |

TABLE II (bis)

| Experiment | Feed rate of the catalyst (milliatoms of Ti/Hour) | Amount of destroying agent used | |
|---|---|---|---|
| | | Al/Ti = 1 | Al/Ti = 5 |
| 12 | 2.4 | 3.42 | 1.14 |
| 13 | 4.4 | 3.75 | 1.25 |
| 14 | 2.75 | 3 | 1 |
| 15 | 3 | 5.85 | 1.95 |
| 16 | 4 | 3.96 | 1.32 |

TABLE III

| Experiment | Destroying agent | Hourly feed rate of the destroying agent, g/hour | Production of polymer, kg/hour | Temperature (° C) | Screen temperature (° C) | Density | M.I. | % of butene recycled | Content of residues Ti | Al | M |
|---|---|---|---|---|---|---|---|---|---|---|---|
| 17 | — | — | 10.5 | 260 | 220 | 0.964 | 3 | 1.5 | 12 | 20 | — |
| 18 | Calcium stearate | 5 | 10.7 | 260 | 220 | 0.964 | 3.5 | 1.3 | 12 | 22 | 34 |
| 19 | — | — | 10.5 | 260 | 220 | 0.960 | 1 | 3.0 | 11 | 20 | — |
| 20 | Calcium stearate | 5 | 10.5 | 260 | 220 | 0.961 | 1 | 2.4 | 10 | 20 | 30 |

We claim:

1. In a continuous process for the polymerization and copolymerization of ethylene which comprises contacting a reaction mixture comprising ethylene with a Ziegler catalyst comprising a transition metal derivative and an organic derivative of aluminum in a reactor maintained at a pressure of greater than about 500 bars and a temperature of greater than about 160° C., and withdrawing said reaction mixture from said reactor through a reactor outlet valve into a separator for separating said ethylene from polymer formed in said reactor, the improvement which comprises terminating said polymerization by injecting into said reaction mixture a salt which upon a reaction with said Ziegler catalyst will form reaction products which remain with said polymer, said salt being selected from the group consisting of alkali metal salts and alkaline earth metal salts of carboxylic acid and mixtures thereof, said salt being present in an amount sufficient to deactivate said Ziegler catalyst.

2. The process of claim 1 wherein said transition metal comprises titanium.

3. The process of claim 1 wherein said salt is injected into said reaction mixture in the molten state.

4. The process of claim 1 wherein said salt is injected into said reaction mixture in the form of a suspension.

5. The process of claim 1 wherein said salt is injected into said reaction mixture in a hydrocarbon solution.

6. The process of claim 1 wherein said salt is injected into said reaction mixture at a point associated with said reactor outlet valve.

7. The process of claim 1 wherein said salt is injected into said reaction mixture in said reactor.

8. The process of claim 1 wherein said salt is injected into said reaction mixture in said separator.

9. The process of claim 1 wherein said salt is selected from the group consisting of the alkali metal salt and alkaline earth metal salts of saturated fatty acids, aromatic acids, and mixtures thereof.

10. The process of claim 1 wherein said salt is present in an amount such that the ratio of milli-equivalent grams of said metal of said salt to milliatoms of aluminum and titanium of said catalyst is between about 0.4 and 8.

* * * * *